(12) United States Patent
Wang et al.

(10) Patent No.: US 11,121,642 B2
(45) Date of Patent: Sep. 14, 2021

(54) SIMPLIFIED SPACE VECTOR MODULATION METHOD FOR MULTI-LEVEL CONVERTER

(71) Applicant: NANCHANG INSTITUTE OF TECHNOLOGY, Nanchang (CN)

(72) Inventors: Cui Wang, Nanchang (CN); Junming Ouyang, Nanchang (CN); Xuan Zeng, Nanchang (CN); Xingwang Zhang, Nanchang (CN); Zhikai Huang, Nanchang (CN); Xiaopin Yang, Nanchang (CN); Jianghua Gan, Xuchang (CN); Sizhe Chen, Guangzhou (CN)

( * ) Notice: Subject to any disclaimer, the term of this patent is extended or adjusted under 35 U.S.C. 154(b) by 0 days.

(21) Appl. No.: 17/060,183

(22) Filed: Oct. 1, 2020

(65) Prior Publication Data
US 2021/0021208 A1    Jan. 21, 2021

Related U.S. Application Data

(63) Continuation of application No. PCT/CN2019/094457, filed on Jul. 3, 2019.

(30) Foreign Application Priority Data

May 21, 2019  (CN) .......................... 201910426666.6

(51) Int. Cl.
*H02M 7/483* (2007.01)
*H02M 7/5387* (2007.01)
*H02M 7/5395* (2006.01)

(52) U.S. Cl.
CPC ......... *H02M 7/4835* (2021.05); *H02M 7/483* (2013.01); *H02M 7/5395* (2013.01); *H02M 7/53875* (2013.01); *H02M 7/53876* (2021.05)

(58) Field of Classification Search
CPC ........... H02M 7/4835; H02M 7/53876; H02M 7/483; H02M 7/53875; H02M 7/5395
See application file for complete search history.

(56) References Cited

U.S. PATENT DOCUMENTS 6,145,730 A * 11/2000 Wiesemann ........... B23K 20/10
                                                           228/102
7,558,089 B2 * 7/2009 Mese .................... H02M 7/487
                                                            363/52

(Continued)

FOREIGN PATENT DOCUMENTS

CN     105245116 A    1/2016
CN     108377105 A    8/2018
(Continued)

*Primary Examiner* — Yusef A Ahmed

(57) ABSTRACT

The disclosure discloses a simplified space vector modulation method for multi-lever converters, and relates to the field of space vector modulation methods for multilevel converters, which solves problems that a redundant on-off state is greatly increased along with increase of a number of levels in a traditional SVM technology, and SVM is difficult to realize due to calculation of the redundant on-off state and selection of a proper on-off state. The method includes the following steps of: step 1: establishing a vector expression; step 2: establishing a reference vector trajectory model; step 3: respectively representing reference signals and level signals by coordinate components of a reference vector and a basic vector and corresponding component sums; step 4: constructing a star-connected multilevel converter; step 5: sampling a phase voltage reference vector trajectory model of the star-connected multilevel converter, and synthesizing the reference vector.

7 Claims, 6 Drawing Sheets

(56) References Cited

U.S. PATENT DOCUMENTS

| | | | |
|---|---|---|---|
| 9,479,084 B2 | 10/2016 | Zhao et al. | |
| 9,979,319 B1* | 5/2018 | Jiao | H02M 7/4833 |
| 10,574,154 B1* | 2/2020 | Qiao | H02M 7/5395 |
| 2003/0173946 A1* | 9/2003 | Liu | G01R 19/0092 |
| | | | 324/107 |
| 2010/0091534 A1* | 4/2010 | Tadano | H02M 5/297 |
| | | | 363/157 |
| 2010/0149848 A1* | 6/2010 | Urushibata | H02M 5/297 |
| | | | 363/148 |
| 2014/0009988 A1* | 1/2014 | Valiani | H02M 7/53875 |
| | | | 363/131 |
| 2014/0016382 A1* | 1/2014 | Teo | H02M 7/5395 |
| | | | 363/123 |
| 2014/0050000 A1* | 2/2014 | Teo | H02M 7/487 |
| | | | 363/131 |
| 2014/0233289 A1* | 8/2014 | Zhao | H02M 7/5395 |
| | | | 363/131 |
| 2014/0334206 A1* | 11/2014 | Valiani | H02M 7/537 |
| | | | 363/97 |
| 2015/0155712 A1* | 6/2015 | Mondal | H02J 3/1857 |
| | | | 307/23 |
| 2015/0188453 A1* | 7/2015 | Damson | H02M 7/53871 |
| | | | 318/504 |
| 2015/0194902 A1* | 7/2015 | Tian | H02M 7/483 |
| | | | 363/37 |
| 2016/0099661 A1* | 4/2016 | Duan | H02M 7/483 |
| | | | 363/41 |
| 2016/0373047 A1* | 12/2016 | Loken | H02M 7/53875 |
| 2017/0063253 A1* | 3/2017 | Fukumaru | H02M 7/5395 |
| 2017/0229871 A1* | 8/2017 | Liu | H02J 3/383 |
| 2017/0229977 A1* | 8/2017 | Mondal | H02M 3/04 |
| 2017/0279370 A1* | 9/2017 | Zhao | H02M 5/293 |
| 2018/0026567 A1* | 1/2018 | El Khamlichi Drissi | |
| | | | H02M 7/53873 |
| | | | 318/139 |
| 2018/0076705 A1* | 3/2018 | Zhao | H02M 5/293 |
| 2019/0229668 A1* | 7/2019 | Jiang | H02P 27/08 |
| 2019/0253015 A1* | 8/2019 | He | H02P 29/50 |
| 2021/0021220 A1* | 1/2021 | Moon | H02P 21/22 |

FOREIGN PATENT DOCUMENTS

| | | |
|---|---|---|
| CN | 108418461 A | 8/2018 |
| CN | 108683349 A | 10/2018 |
| JP | H1023760 A | 1/1998 |

* cited by examiner

SIMPLIFIED SPACE VECTOR MODULATION METHOD FOR MULTI-LEVEL CONVERTER

CROSS-REFERENCE TO RELATED APPLICATIONS

This application is a continuation of International Patent Application No. PCT/CN2019/094457 with a filing date of Jul. 3, 2019, designating the United States, now pending, and further claims priority to Chinese Patent Application No. 201910426666.6 with a filing date of May 21, 2019. The content of the aforementioned applications, including any intervening amendments thereto, are incorporated herein by reference.

TECHNICAL FIELD

The present disclosure relates to the field of space vector modulation methods for multi-level converter, and more particularly, to a simplified space vector modulation method for multi-level converters.

BACKGROUND

At present, Carrier Phase Shifted Modulation (CPS) and Nearest Level Modulation (NLM) are mostly used in high-power multi-level converter devices. With the number of cascaded sub-modules increasing, carrier phase shifted modulation has higher requirement on carrier synchronization, and needs a lot of hardware resources and strict logic sequence. Therefore, a multi-level converter using CPS has a small number of levels, which limits the improvement of a voltage level of a converter. In nearest level modulation technology, a voltage tracking error is large when the number of levels is small, and a large number of harmonic components are widely distributed in a wide frequency band in a spectrum of an output voltage. Moreover, there is no characteristic harmonic, thus being very difficult to design a filter. In summary, the carrier phase shifted modulation and the nearest level modulation both have a special level modulation adaptation range. Compared with the above two modulation methods, Space Vector Modulation (SVM) is easily expanded to multi-level converters with any topology and any number of levels. Under the same DC voltage, a DC voltage utilization rate of the SVM is 15.47% higher than that of the carrier modulation, and the SVM has advantages of a small voltage tracking error, a low switching frequency, a small switching loss and the like.

SVM strategy is widely used in three-level and five-level converters, but is not common in industrial applications of high-voltage high-power converters. The reason is that with the number of levels increasing in a SVM technology, 2/3 conversion is needed, and redundant switching states are greatly increased. Calculation of the redundant switching states and selection of proper switching states greatly increase difficulty in implement the SVM algorithm. Therefore, a simplified space vector modulation method for a multi-level converter is urgently needed in a market to help people solve existing problems.

SUMMARY

The present disclosure is intended to provide a simplified space vector modulation method for a multi-level converter, based on a relationship between a phase voltage and a line voltage of a star-connected converter, a reference vector calculated from phase voltage reference signals is directly used as a line voltage reference vector. Moreover, two line-voltage levels are used as two components of the space vector, with a sum of these two components being a third line-voltage level. These three components are directly used as switching state signals of the control line voltages. The proposed space vector modulation method avoids 2/3 conversion and does not need to calculate redundant switching states, which greatly simplifies a SVM algorithm and ensures that a common-mode voltage of the converter is zero at the any time.

In order to achieve the above objective, the present disclosure provides the following technical solutions: a simplified space vector modulation method for a multi-level converter comprises the following steps of:

step 1: an expression of a basic vector $V_{\alpha\beta}(v_\alpha, v_\beta)$ corresponding to a phase voltage in a traditional Cartesian coordinate system (referred to as an α-β coordinate system) being:

$$\begin{bmatrix} v_\alpha \\ v_\beta \end{bmatrix} = \begin{bmatrix} \frac{1}{3}(2v_a - v_b - v_c) \\ \frac{\sqrt{3}}{3}(v_b - v_c) \end{bmatrix},$$

wherein $v_\alpha$ and $v_\beta$ represent coordinate components corresponding to the basic vector $V_{\alpha\beta}$, $v_a$, $v_b$ and $v_c$ respectively represent levels corresponding to three phase voltages of a multi-level converter, $(v_a, v_b, v_c)$ is called a switching state corresponding to the basic vector $V_{\alpha\beta}$, and for an n-level converter, $v_a, v_b, v_c \in [(n-1), (n-2), \ldots, 2, 1, 0]$; and a reference vector $V_{r\alpha\beta}(v_{r\alpha}, v_{r\beta})$ calculated according to phase voltage reference signals in the α-β coordinate system being:

$$\begin{bmatrix} v_{r\alpha} \\ v_{r\beta} \end{bmatrix} = \frac{\sqrt{3}}{3}m(n-1)\begin{bmatrix} \cos \omega t \\ \sin \omega t \end{bmatrix};$$

wherein $v_{r\alpha}$ and $v_{r\beta}$ represent coordinate components corresponding to the reference vectors $V_{r\alpha\beta}$;

step 2: rotating a coordinate axis of an α-β plane counterclockwise by 45 degrees and scaleding an axial proportion to obtain an α'-β' coordinate system, and establishing a reference vector trajectory model;

a basic vector $V'(v'_\alpha, v'_\beta)$ in the coordinate system α'-β' being:

$$\begin{bmatrix} v'_\alpha \\ v'_\beta \end{bmatrix} = \begin{bmatrix} 1 & 0 & -1 \\ -1 & 1 & 0 \end{bmatrix}\begin{bmatrix} v_a \\ v_b \\ v_c \end{bmatrix} = \begin{bmatrix} v_a - v_c \\ -v_a + v_b \end{bmatrix},$$

wherein $v'_\alpha$ and $v'_\beta$ represent coordinate components corresponding to the basic vector $V'$;

a reference vector $V'_r(v'_{r\alpha}, v'_{r\beta})$ calculated according to phase voltage reference signals in the α'-β' coordinate system being:

$$\begin{bmatrix} v'_{r\alpha} \\ v'_{r\beta} \end{bmatrix} = \frac{m(n-1)}{2}\begin{bmatrix} \sqrt{3}\cos \omega t + \sin \omega t \\ -\sqrt{3}\cos \omega t + \sin \omega t \end{bmatrix},$$

wherein $v'_{r\alpha}$ and $v'_{r\beta}$ represent coordinate components corresponding to the reference vector $V'_r$;

the reference vector trajectory model in the $\alpha'$-$\beta'$ coordinate system being:

$$\left(\frac{v'_{r\alpha}+v'_{r\beta}}{m(n-1)}\right)^2 + \left(\frac{v'_{r\alpha}-v'_{r\beta}}{\sqrt{3}\,m(n-1)}\right)^2 = 1;$$

$$m = \frac{\sqrt{3}\,U_r}{(n-1)E};$$

step 3: in the $\alpha'$-$\beta'$ coordinate system, respectively representing line voltage reference signals $-u_{rca}$, $-u_{rab}$ and $u_{rbc}$ by the coordinate components $v'_{r\alpha}$ and $v'_{r\beta}$ of the reference vector $V'_r$ and the sum of the two components $v'_{r\alpha}+v'_{r\beta}$, and respectively representing line voltage level signals $-v_{ca}$, $-v_{ab}$ and $v_{bc}$ by the coordinate components $v'_\alpha$ and $v'_\beta$ of the basic vector $V'$ and the sum of the two coordinate components $v'_\alpha+v'_\beta$:

$$\begin{cases} v'_{r\alpha} = u_{ra} - u_{rc} = -u_{rca} \\ v'_{r\beta} = -u_{ra} + u_{rb} = -u_{rab} \\ v'_{r\alpha} + v'_{r\beta} = u_{rb} - u_{rc} = u_{rbc} \end{cases},$$

wherein $u_{rab}$, $u_{rbc}$ and $u_{rca}$ respectively represent reference signals of the three line voltages;

$$\begin{bmatrix} v'_\alpha \\ v'_\beta \\ v'_\alpha + v'_\beta \end{bmatrix} = \begin{bmatrix} v_a - v_c \\ -v_a + v_b \\ v_b - v_c \end{bmatrix} = \begin{bmatrix} -v_{ca} \\ -v_{ab} \\ v_{bc} \end{bmatrix},$$

wherein $v_{ab}$, $v_{bc}$ and $v_{ca}$ respectively represent levels corresponding to the three line voltages, $v_{ab}$, $v_{bc}$, $v_{ca} \in [\pm n, \pm(n-1), \ldots, \pm 2, \pm 1, 0]$, and each line voltage outputs $2n+1$ levels;

step 4: constructing a new star-connected multi-level converter, so that line voltage reference signals of the new star-connected multi-level converter are the same as line voltage reference signals of a controlled delta-connected multi-level converter;

step 5: sampling a reference vector trajectory model of the constructed star-connected multi-level converter, calculating three basic vectors closest to the sampled reference vector $V'_r$, using the three basic vectors as equivalent basic vectors, the three equivalent basic vectors forming a sector triangle, and synthesizing the reference vector by using the three equivalent basic vectors;

step 6: calculating duty cycles of the equivalent basic vectors which synthesize the sampled reference vector by using a volt-second balance principle:

when the reference vector is located in Sector-I:

$$\begin{cases} t_1 = T_S(1 + v'_\alpha - v'_{r\alpha}) \\ t_2 = T_S(1 + v'_\beta - v'_{r\beta}) \\ t_3 = T_S(v'_{r\alpha} + v'_{r\beta} - v'_\alpha - v'_\beta - 1) \end{cases},$$

wherein $t_1$, $t_2$ and $t_3$ respectively represent duty cycles of vectors $V'_1$, $V'_2$ and $V'_3$, and $T_S$ represents a sampling period;

when the reference vector is located in Sector-II:

$$\begin{cases} t_0 = T_S(1 + v'_\alpha + v'_\beta - v'_{r\alpha} - v'_{r\beta}) \\ t_1 = T_S(v'_{r\alpha} - v'_\alpha) \\ t_3 = T_S(v'_{r\beta} - v'_\beta) \end{cases},$$

wherein $t_0$, $t_1$ and $t_3$ respectively represent duty cycles of vectors $V'_0$, $V'_1$ and $V'_3$; and step 7: using the components of the equivalent basic vector of the phase voltage reference vector of the star-connected multi-level converter and the sum of the two components as switching states for controlling a line voltage of the delta-connected multi-level converter.

Preferably, in step 5, the sector triangles formed by three adjacent basic vectors are all isosceles right triangles, and the length of the right sides of the isosceles right triangle is unit 1, there are only two types of sector triangles: Sector-I and Sector-II, and the basic vectors forming the Sector-I and Sector-II comprise $V'_0(v'_\alpha, v'_\beta)$, $V'_1(v'_\alpha+1, v'_\beta)$, $V'_2(v'_\alpha+1, v'_\beta+1)$ and $V'_3(v'_\alpha, v'_\beta+1)$, and $$\begin{cases} v'_\alpha = \text{floor}(v'_{r\alpha}) \\ v'_\beta = \text{floor}(v'_{r\beta}) \end{cases},$$

wherein floor(*) represents a rounding down function;

in a first case: wherein $(v'_{r\alpha}-v'_\alpha)+(v'_{r\beta}-v'_\beta) \geq 1$, the reference vector is located in the Sector-I, and the reference vector is synthesized by using the vectors $V'_1(v'_\alpha+1,v'_\beta)$, $V'_2(v'_\alpha+1,v'_\beta+1)$ and $V'_3(v'_\alpha,v'_\beta+1)$; and in a second case: wherein $(v'_{r\alpha}-v'_\alpha)+(v'_{r\beta}-v'_\beta) < 1$, the reference vector is located in Sector-II, and the reference vector is synthesized by using the vectors $V'_0(v'_\alpha,v'_\beta)$, $V'_1(v'_\alpha+1,v'_\beta)$ and $V'_3(v'_\alpha,v'_\beta+1)$.

Preferably, the reference vector is located in Sector-I, when the reference voltage vector $V'_r$ is synthesized by using $V'_1$, $V'_2$ and $V'_3$ according to the volt-second balance principle, the switching states of the corresponding delta-connected multi-level converter are respectively $(-v'_\beta, v'_\alpha+v'_\beta+1, -(v'_\alpha+1))$, $(-(v'_\beta+1), v'_\alpha+v'_\beta+2, -(v'_\alpha+1))$ and $(-(v'_\beta+1), v'_\alpha+v'_\beta+1, -v'_\alpha)$:

(1) during the duty cycle of the basic vector $V'_1$, $-v'_\beta$, $v'_\alpha+v'_\beta+1$ and $-(v'_\alpha+1)$ are respectively used as control signals of a phase AB, a phase BC and a phase CA of the controlled delta-connected multi-level converter;

(2) during the duty cycle of the basic vector $V'_2$, $-(v'_\beta+1)$, $v'_\alpha+v'_\beta+2$ and $-(v'_\alpha+1)$ are respectively used as control signals of the phase AB, the phase BC and the phase CA of the controlled delta-connected multi-level converter;

(3) during the duty cycle of the basic vector $V'_3$, $-(v'_\beta+1)$, $v'_\alpha+v'_\beta+1$ and $-v'_\alpha$ are respectively used as control signals of the phase AB, the phase BC and the phase CA of the controlled delta-connected multi-level converter.

Preferably, the reference vector is located in Sector-II, when the reference voltage vector $V'_r$ is synthesized by using $V'_0$, $V'_1$ and $V'_3$ according to the volt-second balance principle, the switching states of the corresponding delta-connected multi-level converter are respectively $(-v'_\beta, v'_\alpha+v'_\beta, -v'_\alpha)$, $(-v'_\beta, v'_\alpha+v'_\beta+1, -(v'_\alpha+1))$ and $(-(v'_\beta+1), v'_\alpha+v'_\beta+1, -v'_\alpha)$:

(1) during the duty cycle of the basic vector $V'_0$, $-v'_\beta$, $v'_\alpha+v'_\beta$ and $-v'_\alpha$ are respectively used as control signals of the phase AB, the phase BC and the phase CA of the controlled delta-connected multi-level converter;

(2) during the duty cycle of the basic vector $V'_1$, $-v'_\beta$, $v'_\alpha+v'_\beta+1$ and $-(v'_\alpha+1)$ are respectively used as control signals of the phase AB, the phase BC and the phase CA of the controlled delta-connected multi-level converter;

(3) during the duty cycle of the basic vector $V'_3$, $-(v'_\beta+1)$, $v'_\alpha+v'_\beta+1$ and $-v'_\alpha$ are respectively used as control signals of the phase AB, the phase BC and the phase CA of the controlled delta-connected multi-level converter.

Preferably, a sum of the three components of the switching states at any moment is 0, which means that an output common-mode voltage of a three-phase converter is 0.

Preferably, the switching states are used as the control signals of the line voltage of the delta-connected multi-level converter, wherein there are two corresponding components that differ by one level in any two switching states, which means that during one sampling period of the reference vector, when the switching states are switched, a switching path is closed by the four-segment switching method with any one of the three switching states as a starting point, when the reference vector is located in Sector-I, the switching sequence of the switching state is provided with three modes:

mode (1): $(-v'_\beta,v'_\alpha+v'_\beta+1,-(v'_\alpha+1)) \rightarrow (-(v'_\beta+1),v'_\alpha+v'_\beta+2,-(v'_\alpha+1)) \rightarrow (-(v'_\beta+1),v'_\alpha+v'_\beta+1,-v'_\alpha) \rightarrow (-v'_\beta,v'_\alpha+v'_\beta+1,-(v'_\alpha+1))$, corresponding to a duty cycle $t_1/2 \rightarrow t_2 \rightarrow t_3 \rightarrow t_1/2$, mode (2): $(-(v'_\beta+1),v'_\alpha+v'_\beta+2,-(v'_\alpha+1)) \rightarrow (-(v'_\beta+1),v'_\alpha+v'_\beta+1,-v'_\alpha) \rightarrow (-v'_\beta,v'_\alpha+v'_\beta+1,-(v'_\alpha+1)) \rightarrow (-(v'_\beta+1),v'_\alpha+v'_\beta+2,-(v'_\alpha+1))$, corresponding to a duty cycle $t_2/2 \rightarrow t_3 \rightarrow t_1 \rightarrow t_2/2$, mode (3): $(-(v'_\beta+1),v'_\alpha+v'_\beta+1,-v'_\alpha) \rightarrow (-v'_\beta,v'_\alpha+v'_\beta+1,-(v'_\alpha+1)) \rightarrow (-(v'_\beta+1),v'_\alpha+v'_\beta+2,-(v'_\alpha+1)) \rightarrow (-(v'_\beta+1),v'_\alpha+v'_\beta+1,-v'_\alpha)$, corresponding to a duty cycle $t_3/2 \rightarrow t_1 \rightarrow t_2 \rightarrow t_3/2$, any one of the three modes is selected; and when the reference vector is located in Sector-II, the switching sequence of the switching state is provided with three modes:

mode (1): $(-v'_\beta,v'_\alpha+v'_\beta,-v'_\alpha) \rightarrow (-v'_\beta,v'_\alpha+v'_\beta+1,-(v'_\alpha+1)) \rightarrow (-(v'_\beta+1),v'_\alpha+v'_\beta+1,-v'_\alpha) \rightarrow (-v'_\beta,v'_\alpha+v'_\beta,-v'_\alpha)$, corresponding to a duty cycle $t_0/2 \rightarrow t_1 \rightarrow t_3 \rightarrow t_0/2$, mode (2): $(-v'_\beta,v'_\alpha+v'_\beta+1,-(v'_\alpha+1)) \rightarrow (-(v'_\beta+1),v'_\alpha+v'_\beta+1,-v'_\alpha) \rightarrow (-v'_\beta,v'_\alpha+v'_\beta,-v'_\alpha) \rightarrow (-v'_\beta,v'_\alpha+v'_\beta+1,-(v'_\alpha+1))$, corresponding to a duty cycle $t_1/2 \rightarrow t_3 \rightarrow t_0 \rightarrow t_1/2$, mode (3): $(-(v'_\beta+1),v'_\alpha+v'_\beta+1,-v'_\alpha) \rightarrow (-v'_\beta,v'_\alpha+v'_\beta,-v'_\alpha) \rightarrow (-v'_\beta,v'_\alpha+v'_\beta+1,-(v'_\alpha+1)) \rightarrow (-(v'_\beta+1),v'_\alpha+v'_\beta+1,-v'_\alpha)$, corresponding to a duty cycle $t_3/2 \rightarrow t_0 \rightarrow t_1 \rightarrow t_3/2$, any one of the three modes is selected.

Preferably, each phase in the delta-connected multi-level converter is formed by cascading 2k H-bridge sub-modules, an output line voltage has 4k+1 levels, an output phase voltage of the star-connected multi-level converter has 2k+1 levels, and an output line voltage has 4k+1 levels, which means that a number of levels of the output line voltage of the star-connected converter formed by cascading k H-bridge sub-modules is equal to a number of levels of the output line voltage of the delta-connected converter formed by cascading 2k H-bridge sub-modules.

Preferably, in the α'-β' coordinate system, the star-connected converter formed by cascading 2k H-bridge sub-modules is modulated by the simplified space vector modulation method for the multi-level converter according to the following steps:

step 1: imagining a star-connected converter, wherein each phase of the converter is formed by cascading k H-bridge sub-modules;

step 2: dividing the phase voltage reference signals of the controlled converter by $\sqrt{3}$ to obtain phase voltage reference signals of the imaged converter; and step 3: in the α'-β' coordinate system, sampling a phase voltage reference vector trajectory model of the imaged converter, synthesizing the reference vector by using three equivalent basic vectors on the sector triangle, and using the coordinate components of the equivalent basic vector and the sum of the two coordinate components as switching state signals of three phases of the controlled converter to realize space vector modulation.

Compared with the prior art, the present disclosure has the beneficial effects as follows.

By analyzing physical meanings of the reference vector and the basic vector in a 45-degree rotating coordinate system, in the coordinate system, the coordinate components of the reference vector calculated according to the phase voltage reference signals and the sum of the two components are equivalent to the line voltage reference signals, and the coordinate components of the basic vector and the sum of the two components are equivalent to the switching state signals for controlling the line voltage. On this basis, a relationship between the phase voltage and the line voltage of the star-connected converter is used to directly use the coordinate components of the reference vector calculated according to the phase voltage reference signals and the sum of the two components as the line voltage reference signals and directly use the coordinate components of the equivalent basic vector which synthesizes the reference vector and the sum of the two components as the switching state signals for controlling the line voltage, and the method avoids 2/3 conversion which must be completed in a traditional space vector modulation algorithm and does not need to calculate redundant switching states, greatly simplifies a SVM algorithm and ensures that a common-mode voltage is zero, thus improving an output voltage performance of the converter, being conveniently popularized and applied to a multi-level converter with any topology without increasing a difficulty in realizing the algorithm.

BRIEF DESCRIPTION OF THE DRAWINGS

FIG. 5A and FIG. 5B are principle diagrams of a triangle-connected H-bridge-cascaded multilevel converter according to the present disclosure; wherein FIG. 5A shows the multilevel converter comprises the triangle-connected converter formed by cascading the H-bridge sub-modules; FIG. 5B shows each phase in the figure is formed by cascading 2k H-bridge sub-modules.

DETAILED DESCRIPTION

The technical solutions in the embodiments of the present disclosure are clearly and completely described with reference to the accompanying drawings in the embodiments of the present disclosure. Apparently, the described embodiments are only some but not all of the embodiments of the present disclosure.

With reference to FIG. 1 to FIG. 6, according to an embodiment provided by the present disclosure, a simplified space vector modulation method for a multi-level converter comprises the following steps.

In step 1, expressions of a basic vector and a reference vector in a traditional Cartesian coordinate system (referred to as an α-β coordinate system) are provided:

wherein reference signals of a phase voltage of the converter are:

$$\begin{cases} u_{ra} = U_r \cos \omega t/E \\ u_{rb} = U_r \cos(\omega t - 2\pi/3)/E \\ u_{rc} = U_r \cos(\omega t + 2\pi/3)/E \end{cases}$$

wherein $U_r$ represents a phase voltage amplitude expected to be outputted by the converter, which is also called a reference voltage amplitude, and E represents a direct current voltage corresponding to a unit level.

In the α-β coordinate system, according to a definition of a space vector, a reference vector $V_{r\alpha\beta}(v_{r\alpha}, v_{r\beta})$ is:

$$\begin{aligned} V_{r\alpha\beta} &= \frac{2}{3}\left[u_{ra} + e^{j\frac{2\pi}{3}} u_{rb} + \left(e^{j\frac{2\pi}{3}}\right)^2 u_{rc}\right] \\ &= \frac{1}{3}\left[(2u_{ra} - u_{rb} - u_{rc}) + j\sqrt{3}(u_{rb} - u_{rc})\right] \\ &= U_r(\cos \omega t + j \sin \omega t)/E \\ &= v_{r\alpha} + j v_{r\beta} \end{aligned} \quad (1)$$

wherein $v_{r\alpha}$ and $v_{r\beta}$ represent coordinate components corresponding to the reference vector $V_{r\alpha\beta}$.

A relationship between a basic vector $V_{\alpha\beta}(v_\alpha, v_\beta)$ and levels of three phase voltages is:

$$\begin{bmatrix} v_\alpha \\ v_\beta \end{bmatrix} = \begin{bmatrix} \frac{1}{3}(2v_a - v_b - v_c) \\ \frac{\sqrt{3}}{3}(v_b - v_c) \end{bmatrix}, \quad (2)$$

wherein $v_\alpha$ and $v_\beta$ represent coordinate components corresponding to the basic vector $V_{\alpha\beta}$, $v_a$, $v_b$ and $v_c$ respectively represent levels of three phase voltages of a multi-level converter, $(v_a, v_b, v_c)$ is called a switching state corresponding to the basic vector $V_{\alpha\beta}$, and for an n-level converter, $v_a$, $v_b$, $v_c \in [(n-1), (n-2), \ldots, 2, 1, 0]$.

Figure 1:
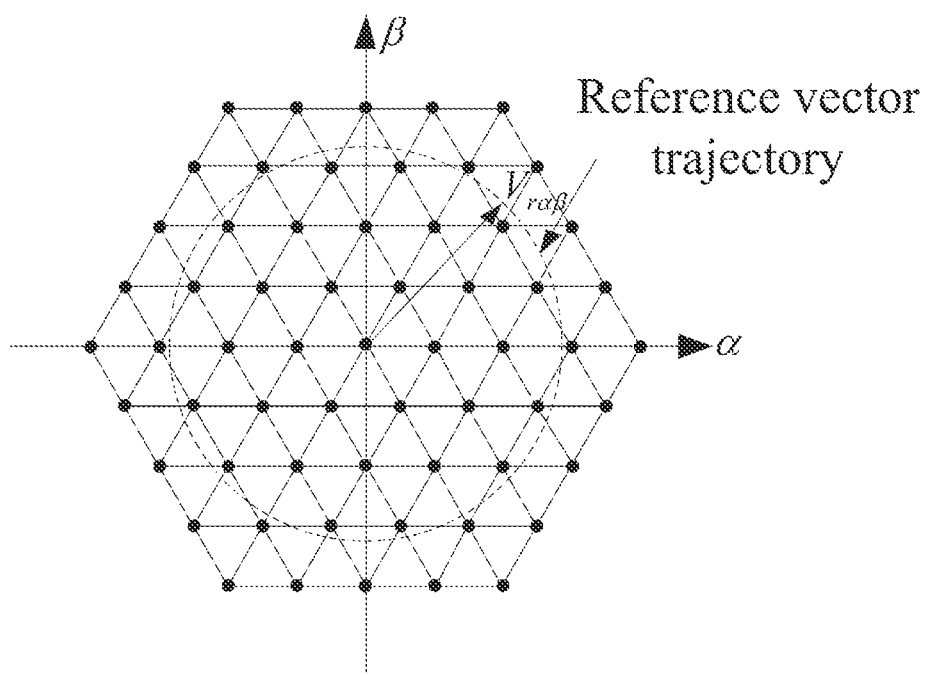
FIG. 1 is a diagram showing space vector distribution of a five-level converter under an α-β coordinate and a reference vector trajectory according to the present disclosure.

A reference vector trajectory of a five-level converter under an α-β coordinate and space vector distribution are established, wherein three adjacent vectors form a sector triangle, as shown in FIG. 1.

A maximum value $U_{rmax}$ of a reference voltage amplitude of an n-level converter is:

$$U_{rmax} = \frac{\sqrt{3}}{3}(n-1)E. \quad (3)$$

A direct current voltage has a maximum utilization rate at the moment, which is set to be 1, and an actual utilization rate of the direct current voltage is changed according to a change of the reference voltage amplitude. An actual reference voltage amplitude is:

$$U_r = mU_{rmax} \quad (4),$$

wherein m is a modulation coefficient, a change of m leads to a change of a radius of a trajectory circle of the reference vector, a value of m reflects the utilization rate of the direct current voltage, and $$m = \frac{\sqrt{3} U_r}{(n-1)E}.$$

Formulas (3) and (4) are substituted into a formula (1) to obtain:

$$\begin{bmatrix} v_{r\alpha} \\ v_{r\beta} \end{bmatrix} = \frac{\sqrt{3}}{3}m(n-1)\begin{bmatrix} \cos \omega t \\ \sin \omega t \end{bmatrix}. \quad (5)$$

Figure 2:
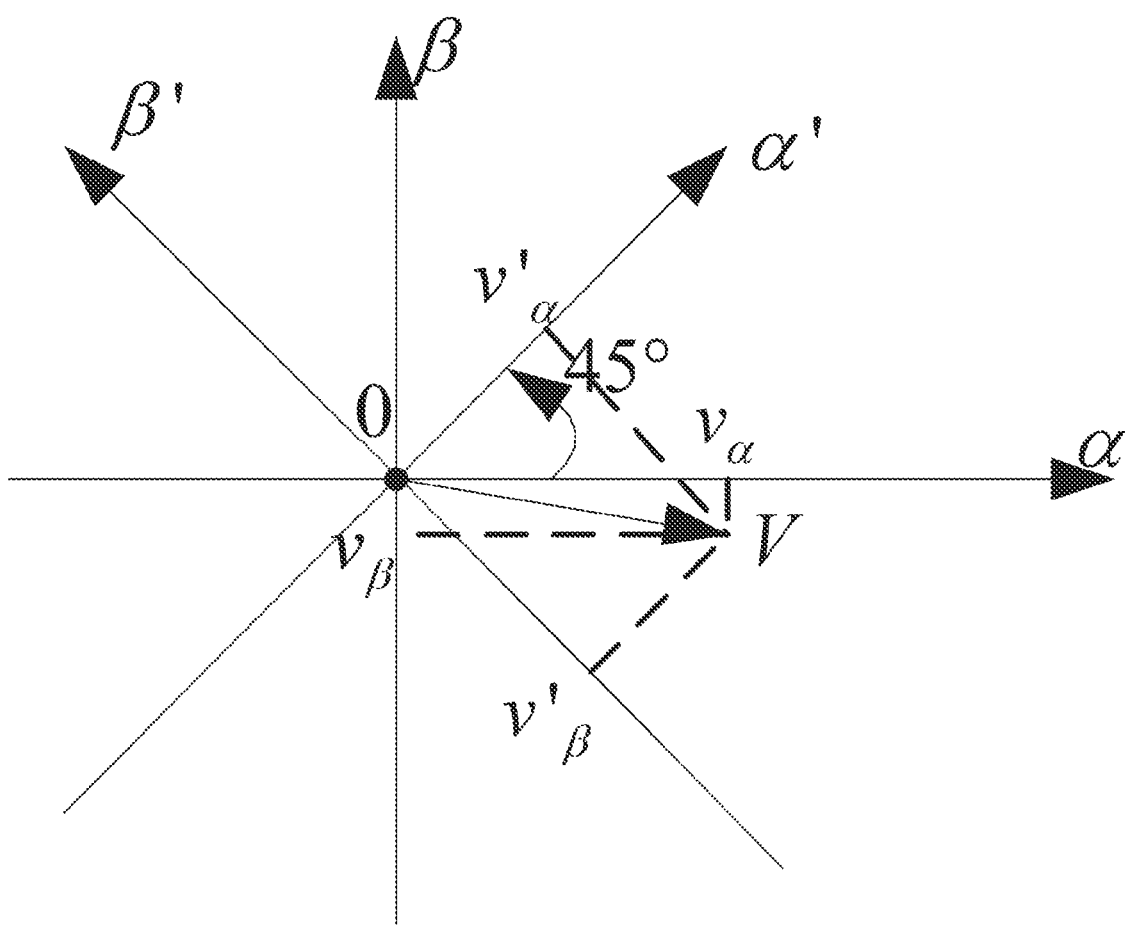
FIG. 2 is a diagram showing a transformation relationship between an α'-β' coordinate system and an α-β coordinate system according to the present disclosure.

In step 2, a coordinate axis of an α-β plane is rotated counterclockwise by 45 degrees and an axial proportion is compressed to obtain an α'-β' coordinate system, the expression of the basic vector in the α'-β' coordinate system is calculated, and a reference vector trajectory model is established. A coordinate transformation principle is shown in FIG. 2:

$$\begin{bmatrix} v'_\alpha \\ v'_\beta \end{bmatrix} = C\begin{bmatrix} v_\alpha \\ v_\beta \end{bmatrix} = C_r C_c \begin{bmatrix} v_\alpha \\ v_\beta \end{bmatrix}, \quad (6)$$

wherein $C_r$ is a 45-degree counterclockwise rotation transformation matrix, $$C_r = \begin{bmatrix} \cos\frac{\pi}{4} & \sin\frac{\pi}{4} \\ -\sin\frac{\pi}{4} & \cos\frac{\pi}{4} \end{bmatrix} = \begin{bmatrix} \frac{\sqrt{2}}{2} & \frac{\sqrt{2}}{2} \\ -\frac{\sqrt{2}}{2} & \frac{\sqrt{2}}{2} \end{bmatrix},$$

$C_c$ is an axial compression transformation matrix, and $$C_c = \begin{bmatrix} 3\sqrt{2}/2 & 0 \\ 0 & \sqrt{6}/2 \end{bmatrix}.$$

A formula (2) is substituted into a formula (6) to obtain a basic vector $V'(v'_\alpha, v'_\beta)$ in the α'-β' coordinate system, which is:

$$\begin{bmatrix} v'_\alpha \\ v'_\beta \end{bmatrix} = \begin{bmatrix} 1 & 0 & -1 \\ -1 & 1 & 0 \end{bmatrix}\begin{bmatrix} v_a \\ v_b \\ v_c \end{bmatrix} = \begin{bmatrix} v_a - v_c \\ -v_a + v_b \end{bmatrix}, \quad (7)$$

wherein $v'_\alpha$ and $v'_\beta$ represent coordinate components corresponding to the basic vector V'.

A reference vector $V'_r(v'_{r\alpha}, v'_{r\beta})$ in the $\alpha'$-$\beta'$ coordinate system is:

$$\begin{bmatrix} v'_{r\alpha} \\ v'_{r\beta} \end{bmatrix} = \frac{m(n-1)}{2} \begin{bmatrix} \sqrt{3}\cos\omega t + \sin\omega t \\ -\sqrt{3}\cos\omega t + \sin\omega t \end{bmatrix}, \quad (8)$$

wherein $v'_{r\alpha}$ and $v'_{r\beta}$ represent coordinate components corresponding to the reference vector $V'_r$.

The reference vector trajectory model in the $\alpha'$-$\beta'$ coordinate system is:

$$\left(\frac{v'_{r\alpha} + v'_{r\beta}}{m(n-1)}\right)^2 + \left(\frac{v'_{r\alpha} - v'_{r\beta}}{\sqrt{3}\,m(n-1)}\right)^2 = 1. \quad (9)$$

In step 3, in the $\alpha'$-$\beta'$ coordinate system, line voltage reference signals $-u_{rca}$, $-u_{rab}$ and $u_{rbc}$ are respectively represented by the coordinate components $v'_{r\alpha}$ and $v'_{r\beta}$ of the reference vector $V'_r$ and the sum of two components $v'_{r\alpha} + v'_{r\beta}$, and line voltage level signals $-v_{ca}$, $-v_{ab}$ and $v_{bc}$ are respectively represented by the coordinate components $v'_\alpha$ and $v'_\beta$ of the basic vector $V'$ and the sum of two coordinate components $v'_\alpha + v'_\beta$.

According to a formula (7), $$\begin{cases} v'_{r\alpha} = u_{ra} - u_{rc} = -u_{rca} \\ v'_{r\beta} = -u_{ra} + u_{rb} = -u_{rab} \\ v'_{r\alpha} + v'_{r\beta} = u_{rb} - u_{rc} = u_{rbc} \end{cases}, \quad (10)$$

wherein $u_{rab}$, $u_{rbc}$ and $u_{rca}$ respectively represent reference signals of the three line voltages, and a formula (10) is consistent with a formula (8).

$$\begin{bmatrix} v'_\alpha \\ v'_\beta \\ v'_\alpha + v'_\beta \end{bmatrix} = \begin{bmatrix} v_a - v_c \\ -v_a + v_b \\ v_b - v_c \end{bmatrix} = \begin{bmatrix} -v_{ca} \\ -v_{ab} \\ v_{bc} \end{bmatrix}, \quad (11)$$

wherein $v_{ab}$, $v_{bc}$ and $v_{ca}$ respectively represent levels corresponding to the three line voltages, $v_{ab}, v_{bc}, v_{ca} \in [\pm n, \pm(n-1), \ldots, \pm 2, \pm 1, 0]$, and each line voltage outputs $2n+1$ levels.

Figure 3:
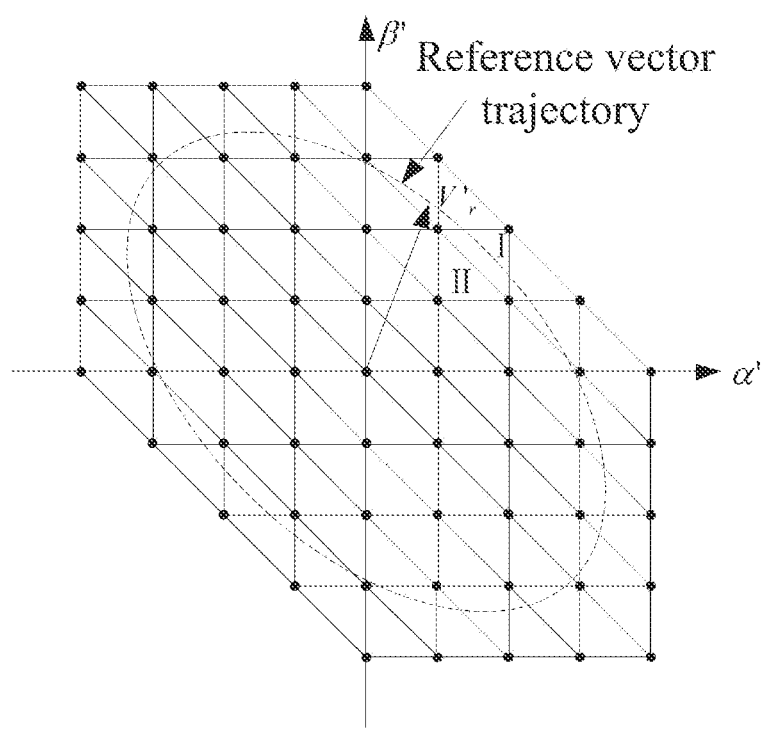
FIG. 3 is a diagram showing space vector distribution of a five-level converter under an α'-β' coordinate and a reference vector trajectory according to the present disclosure.

A reference vector trajectory of a five-level converter under an $\alpha'$-$\beta'$ coordinate and space vector distribution are shown in FIG. 3.

In step 4, a new star-connected multi-level converter is constructed, so that line voltage reference signals of the new star-connected multi-level converter are the same as line voltage reference signals of a controlled delta-connected multi-level converter.

In step 5, a phase voltage reference vector trajectory model of the constructed star-connected multi-level converter is sampled, three basic vectors closest to the sampled reference vector $V'_r$ are calculated, and the three basic vectors are used as equivalent basic vectors. The three equivalent basic vectors form a sector triangle, and the reference vector is synthesized by using the three equivalent basic vectors.

Figure 4:
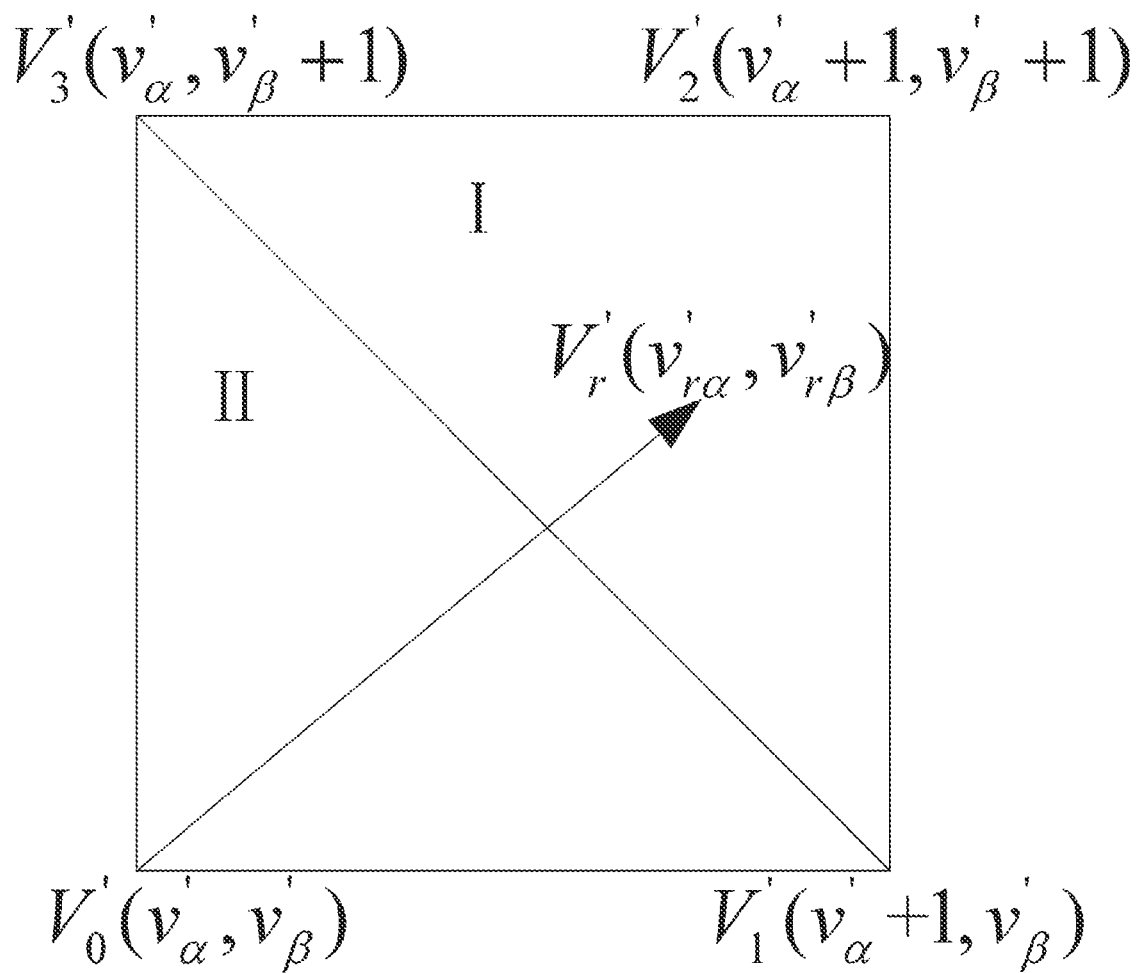
FIG. 4 is a diagram showing locating of a sector triangle and a synthesis principle of a reference vector according to the present disclosure.

The sector triangles formed by three adjacent basic vectors are all isosceles right triangles, and a length of a right side of the isosceles right triangle is unit 1. The sector triangles are in Sector-I and Sector-II, and a locating principle of the sector triangle used is shown in FIG. 4.

Four vectors $V'_0(v'_\alpha, v'_\beta)$, $V'_1(v'_\alpha+1, v'_\beta)$, $V'_2(v'_\alpha+1, v'_\beta+1)$ and $V'_3(v'_\alpha, v'_\beta+1)$ form a unit square, and $$\begin{cases} v'_\alpha = \text{floor}(v'_{r\alpha}) \\ v'_\beta = \text{floor}(v'_{r\beta}) \end{cases}, \quad (12)$$

wherein floor(*) represents a rounding down function.

$(v'_{r\alpha} - v'_\alpha) + (v'_{r\beta} - v'_\beta) \geq 1$, wherein the reference vector is located in the Sector-I, and the reference vector is synthesized by using the vectors $V'_1(v'_\alpha+1, v'_\beta)$, $V'_2(v'_\alpha+1, v'_\beta+1)$ and $V'_3(v'_\alpha, v'_\beta+1)$.

$(v'_{r\alpha} - v'_\alpha) + (v'_{r\beta} - v'_\beta) < 1$, wherein the reference vector is located in the Sector-II, and the reference vector is synthesized by using the vectors $V'_0(v'_\alpha, v'_\beta)$, $V'_1(v'_\alpha+1, v'_\beta)$ and $V'_3(v'_\alpha, v'_\beta+1)$.

In step 6, duty cycles of the equivalent basic vectors which synthesize the sampled reference vector are calculated by using a volt-second balance principle.

When the reference vector is located in a Sector-I, according to the volt-second balance principle, $$\begin{cases} V'_1 t_1 + V'_2 t_2 + V'_3 t_3 = V'_r T_S \\ t_1 + t_2 + t_3 = T_S \end{cases}, \quad (13)$$

wherein $t_1$, $t_2$ and $t_3$ respectively represent duty cycles of vectors $V'_1$, $V'_2$ and $V'_3$, and $T_S$ represents a sampling period.

$$\begin{cases} t_1 = T_S(1 + v'_\alpha - v'_{r\alpha}) \\ t_2 = T_S(1 + v'_\beta - v'_{r\beta}) \\ t_3 = T_S(v'_{r\alpha} + v'_{r\beta} - v'_\alpha - v'_\beta - 1) \end{cases}, \quad (14)$$

when the reference vector is located in a Sector-II, according to the volt-second balance principle, $$\begin{cases} V'_0 t_0 + V'_1 t_1 + V'_3 t_3 = V'_r T_S \\ t_0 + t_1 + t_3 = T_S \end{cases}, \quad (15)$$

wherein $t_0$, $t_1$ and $t_3$ respectively represent duty cycles of vectors $V'_0$, $V'_1$ and $V'_3$, and $$\begin{cases} t_0 = T_S(1 + v'_\alpha + v'_\beta - v'_{r\alpha} - v'_{r\beta}) \\ t_1 = T_S(v'_{r\alpha} - v'_\alpha) \\ t_3 = T_S(v'_{r\beta} - v'_\beta) \end{cases}. \quad (16)$$

In step 7, the components of the equivalent basic vector of the phase voltage reference vector of the star-connected multi-level converter and the sum of the two components are used as switching states for controlling a line voltage of the delta-connected multi-level converter.

Figure 5A:
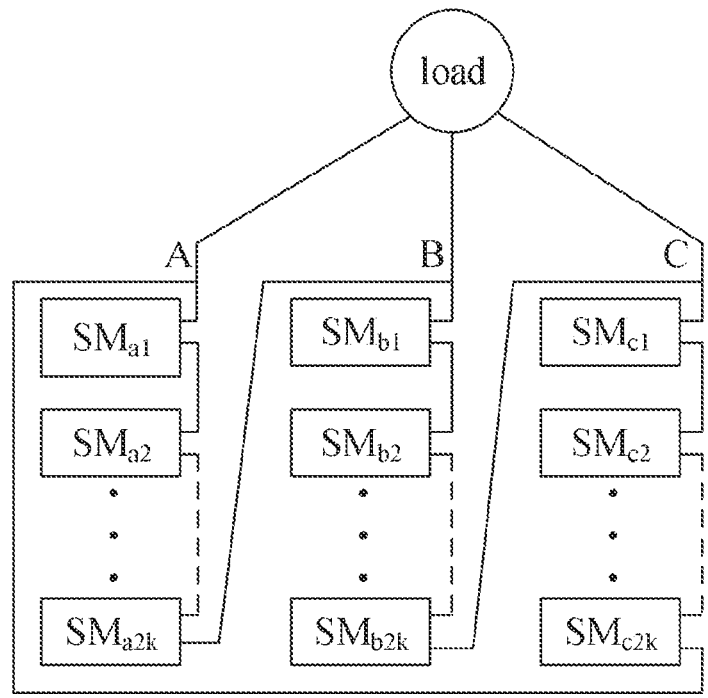
Figure 5B:
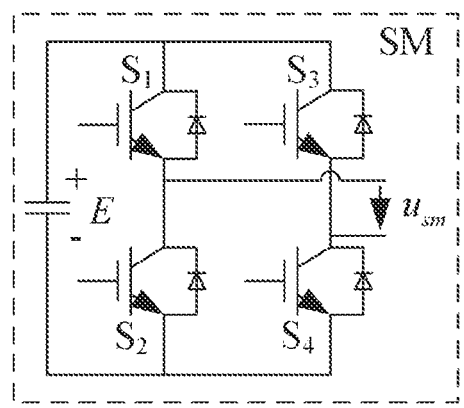
Figure 6:
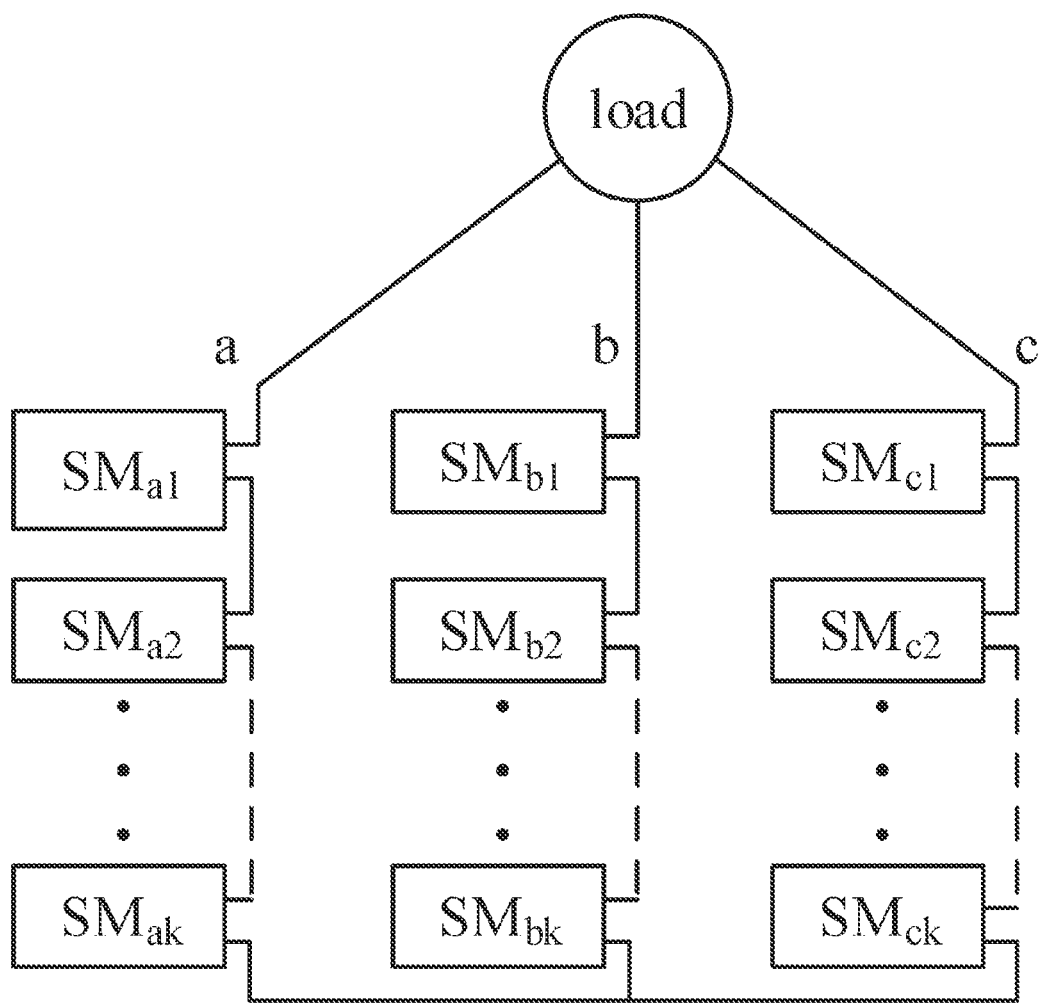
FIG. 6 is a principle diagram of a star-connected H-bridge-cascaded multi-level converter according to the present disclosure.

Further, the multi-level converter comprises the delta-connected converter formed by cascading the H-bridge sub-modules (as shown in FIG. 5) and the star-connected converter formed by cascading the H-bridge sub-modules (as shown in FIG. 6). Taking the delta-connected converter formed by cascading the H-bridge sub-modules as an example, each phase in the figure is formed by cascading 2k H-bridge sub-modules (as shown in FIG. 5(b)). An input voltage of the H-bridge sub-modules is E and an output voltage of the H-bridge sub-modules is $u_{sm}$. When $S_1$ and $S_4$ are on and $S_2$ and $S_3$ are off, $u_{sm}$=E. When $S_1$ and $S_4$ are off and $S_2$ and $S_3$ are on, $u_{sm}$=−E. When $S_1$ and $S_3$ are on and $S_2$ and $S_4$ are off, or when $S_1$ and $S_3$ are off and $S_2$ and $S_4$ are on, $u_{sm}$=0. An output line voltage of the delta-connected converter with each phase formed by cascading 2k sub-modules has 4k+1 levels.

An output phase voltage of the star-connected converter with each phase formed by cascading k sub-modules has 2k+1 levels, and an output line voltage has 4k+1 levels, which means that a number of levels of the output line voltage of the star-connected converter formed by cascading k H-bridge sub-modules is equal to a number of levels of the output line voltage of the delta-connected converter formed by cascading 2k H-bridge sub-modules.

Line voltage reference signals outputted by the delta-connected converter are equal to line voltage reference signals outputted by the star-connected converter, and according to a formula (10):

$$\begin{cases} u_{rAB} = u_{rab} = -v'_{r\beta} \\ u_{rBC} = u_{rbc} = v'_{r\alpha} + v'_{r\beta} \\ u_{rCA} = u_{rca} = -v'_{r\alpha} \end{cases} \quad (17)$$

wherein $u_{rAB}$, $u_{rBC}$ and $u_{rCA}$ respectively represent the line voltage reference signals of the delta-connected converter, and $u_{rab}$, $u_{rbc}$ and $u_{rca}$ respectively represent the line voltage reference signals of the star-connected converter.

According to a formula (11):

$$\begin{bmatrix} v'_{AB} \\ v'_{BC} \\ v'_{CA} \end{bmatrix} = \begin{bmatrix} v'_{ab} \\ v'_{bc} \\ v'_{ca} \end{bmatrix} = \begin{bmatrix} -v'_{\beta} \\ v'_{\alpha} + v'_{\beta} \\ -v'_{\alpha} \end{bmatrix}, \quad (18)$$

wherein $v'_{AB}$, $v'_{BC}$ and $v'_{CA}$ respectively represent output levels corresponding to line voltages of the delta-connected converter, $(v'_{AB}, v'_{BC}, v'_{CA})$ refers to a switching state of the delta-connected converter, and $v'_{ab}$, $v'_{bc}$ and $v'_{ca}$ respectively represent output levels corresponding to line voltages of the star-connected converter.

For the star-connected converter, any reference vector $V'_r(v'_{r\alpha},v'_{r\beta})$ is synthesized by using three vectors $V'_H(v'_{\alpha h},v'_{\beta h})$, $V'_I(v'_{\alpha i},v'_{\beta i})$ and $V'_J(v'_{\alpha j}, v'_{\beta j})$ and:

$$\begin{cases} \begin{bmatrix} v'_{\alpha h} \\ v'_{\beta h} \end{bmatrix} t_h + \begin{bmatrix} v'_{\alpha i} \\ v'_{\beta i} \end{bmatrix} t_i + \begin{bmatrix} v'_{\alpha j} \\ v'_{\beta j} \end{bmatrix} t_j = \begin{bmatrix} v'_{r\alpha} \\ v'_{r\beta} \end{bmatrix} T_S \\ t_h + t_i + t_j = T_S \end{cases} \quad (19)$$

wherein $t_h$, $t_i$ and $t_j$ respectively represent duty cycles of vectors $V'_H$, $V'_I$ and $V'_J$.

According to a formula (19):

$$\begin{cases} \begin{bmatrix} -v'_{\beta h} \\ v'_{\alpha h} + v'_{\beta h} \\ -v'_{\alpha h} \end{bmatrix} t_h + \begin{bmatrix} -v'_{\beta i} \\ v'_{\alpha i} + v'_{\beta i} \\ -v'_{\alpha i} \end{bmatrix} t_i + \begin{bmatrix} -v'_{\beta j} \\ v'_{\alpha j} + v'_{\beta j} \\ -v'_{\alpha j} \end{bmatrix} t_j = \begin{bmatrix} -v'_{r\beta} \\ v'_{r\alpha} + v'_{r\beta} \\ -v'_{r\alpha} \end{bmatrix} T_S, \\ t_h + t_i + t_j = T_S \end{cases} \quad (20)$$

$(-v'_{\beta h}, v'_{\alpha h}+v'_{\beta h}, -v'_{\alpha h})$, $(-v'_{\beta i}, v'_{\alpha i}+v'_{\beta i}, -v'_{\alpha i})$ and $(-v'_{\beta j}, v'_{\alpha j}+v'_{\beta j}, -v'_{\alpha j})$ respectively represent switching states of the line voltage of the star-connected converter corresponding to the basic vectors $V'_H$, $V'_I$ and $V'_J$. According to formulas (17) and (18), the switching states of the line voltage of the star-connected converter may be used as the switching state signals of the line voltage of the delta-connected converter, which means that the line voltage of the delta-connected converter may be directly modulated by using the switching states of the line voltage obtained by the star-connected converter.

Taking the reference vector $V'_r$ shown in FIG. 4 as an example, the reference vector $V'_r$ is located in Sector-I, $V'_r$ is synthesized by using $V'_1$, $V'_2$ and $V'_3$, and:

$$\begin{bmatrix} v'_{\alpha} + 1 \\ v'_{\beta} \end{bmatrix} t_1 + \begin{bmatrix} v'_{\alpha} + 1 \\ v'_{\beta} + 1 \end{bmatrix} t_2 + \begin{bmatrix} v'_{\alpha} \\ v'_{\beta} + 1 \end{bmatrix} t_3 = \begin{bmatrix} v'_{r\alpha} \\ v'_{r\beta} \end{bmatrix} T_S. \quad (21)$$

A formula (21) is linearly transformed to obtain:

$$\begin{bmatrix} -v'_{\beta} \\ v'_{\alpha} + v'_{\beta} + 1 \\ -(v'_{\alpha} + 1) \end{bmatrix} t_1 + \begin{bmatrix} -(v'_{\beta} + 1) \\ v'_{\alpha} + v'_{\beta} + 2 \\ -(v'_{\alpha} + 1) \end{bmatrix} t_2 + \begin{bmatrix} -(v'_{\beta} + 1) \\ v'_{\alpha} + v'_{\beta} + 1 \\ -v'_{\alpha} \end{bmatrix} t_3 = \begin{bmatrix} -v'_{r\beta} \\ v'_{r\alpha} + v'_{r\beta} \\ -v'_{r\alpha} \end{bmatrix} T_S = \begin{bmatrix} u'_{rAB} \\ u'_{rBC} \\ u'_{rCA} \end{bmatrix} T_S. \quad (22)$$

According to (22), a line voltage reference signal ($u'_{rAB}$, $u'_{rBC}$, $u'_{rCA}$) is synthesized by using switching states $(-v'_{\beta}, v'_{\alpha}+v'_{\beta}+1,-(v'_{\alpha}+1))$, $(-(v'_{\beta}+1),v'_{\alpha}+v'_{\beta}+2,-(v'_{\alpha}30\ 1))$ and $(-(v'_{\beta}30\ 1),v'_{\alpha}+v'_{\beta}+1,-v'_{\alpha})$ according to a time-sharing system to control the line voltage of the delta-connected converter.

If the reference vector $V'_r$ is located in Sector-II, $V'_r$ is synthesized by using $V'_0$, $V'_1$ and $V'_3$, and:

$$\begin{bmatrix} v'_{\alpha} \\ v'_{\beta} \end{bmatrix} t_0 + \begin{bmatrix} v'_{\alpha} + 1 \\ v'_{\beta} \end{bmatrix} t_1 + \begin{bmatrix} v'_{\alpha} \\ v'_{\beta} + 1 \end{bmatrix} t_3 = \begin{bmatrix} v'_{r\alpha} \\ v'_{r\beta} \end{bmatrix} T_S. \quad (23)$$

A formula (23) is linearly transformed to obtain:

$$\begin{bmatrix} -v'_{\beta} \\ v'_{\alpha} + v'_{\beta} \\ -v'_{\alpha} \end{bmatrix} t_0 + \begin{bmatrix} -v'_{\beta} \\ v'_{\alpha} + v'_{\beta} + 1 \\ -(v'_{\alpha} + 1) \end{bmatrix} t_1 + \begin{bmatrix} -(v'_{\beta} + 1) \\ v'_{\alpha} + v'_{\beta} + 1 \\ -v'_{\alpha} \end{bmatrix} t_3 = \begin{bmatrix} -v'_{r\beta} \\ v'_{r\alpha} + v'_{r\beta} \\ -v'_{r\alpha} \end{bmatrix} T_S = \begin{bmatrix} u'_{rAB} \\ u'_{rBC} \\ u'_{rCA} \end{bmatrix} T_S. \quad (24)$$

According to (24), a line voltage reference signal ($u'_{rAB}$, $u'_{rBC}$, $u'_{rCA}$) is synthesized by using switching states ($-v'_\beta$, $v'_\alpha+v'_\beta, -v'_\alpha$), ($-v'_\beta, v'_\alpha+v'_\beta+1, -(v'_\alpha+1)$) and ($-(v'_\beta+1), v'_\alpha+v'_\beta+1, -v'_\alpha$) according to volt-second balance principle to control the line voltage of the delta-connected converter.

Further, a sum of the three components of the switching states at any moment is 0, which means that an output common-mode voltage of a three-phase converter is 0.

Further, the line voltage reference signals are synthesized by the switching states, wherein two components of every two of three switching states differ by one level, and during one sampling period of the reference vector, when the switching states are switched, a switching path is closed by a four-segment switching method with any one of the three switching states as a starting point, The reference vector $V'_r$ is located in Sector-I, and a switching sequence of a switching state is provided with three modes:

mode (1): $(-v'_\beta, v'_\alpha+v'_\beta+1, -(v'_\alpha+1)) \rightarrow (-(v'_\beta+1), v'_\alpha+v'_\beta+2, -(v'_\alpha+1)) \rightarrow (-(v'_\beta+1), v'_\alpha+v'_\beta+1, -v'_\alpha) \rightarrow (-v'_\beta, v'_\alpha+v'_\beta+1, -(v'_\alpha+1))$, corresponding to a duty cycle $t_1/2 \rightarrow t_2 \rightarrow t_3 \rightarrow t_1/2$, mode (2): $(-(v'_\beta+1), v'_\alpha+v'_\beta+2, -(v'_\alpha+1)) \rightarrow (-(v'_\beta+1), v'_\alpha+v'_\beta+1, -v'_\alpha) \rightarrow (-v'_\beta, v'_\alpha+v'_\beta+1, -(v'_\alpha+1)) \rightarrow (-(v'_\beta+1), v'_\alpha+v'_\beta+2, -(v'_\alpha+1))$, corresponding to a duty cycle $t_2/2 \rightarrow t_3 \rightarrow t_1 \rightarrow t_2/2$, mode (3): $(-(v'_\beta+1), v'_\alpha+v'_\beta+1, -v'_\alpha) \rightarrow (-v'_\beta, v'_\alpha+v'_\beta+1, -(v'_\alpha+1)) \rightarrow (-(v'_\beta+1), v'_\alpha+v'_\beta+2, -(v'_\alpha+1)) \rightarrow (-(v'_\beta+1), v'_\alpha+v'_\beta+1, -v'_\alpha)$, corresponding to a duty cycle $t_3/2 \rightarrow t_1 \rightarrow t_2 \rightarrow t_3/2$, any one of the three modes is selected.

The reference vector $V'_r$ is located in the II-type sector triangle, and the switching sequence of the switching state is provided with three modes:

mode (1): $(-v'_\beta, v'_\alpha+v'_\beta, -v'_\alpha) \rightarrow (-v'_\beta, v'_\alpha+v'_\beta+1, -(v'_\alpha+1)) \rightarrow (-(v'_\beta+1), v'_\alpha+v'_\beta+1, -v'_\alpha) \rightarrow (-v'_\beta, v'_\alpha+v'_\beta, -v'_\alpha)$, corresponding to a duty cycle $t_0/2 \rightarrow t_1 \rightarrow t_3 \rightarrow t_0/2$, mode (2): $(-v'_\beta, v'_\alpha+v'_\beta+1, -(v'_\alpha+1)) \rightarrow (-(v'_\beta+1), v'_\alpha+v'_\beta+1, -v'_\alpha) \rightarrow (-v'_\beta, v'_\alpha+v'_\beta, -v'_\alpha) \rightarrow (-v'_\beta, v'_\alpha+v'_\beta+1, -(v'_\alpha+1))$, corresponding to a duty cycle $t_1/2 \rightarrow t_3 \rightarrow t_0 \rightarrow t_1/2$, mode (3): $(-(v'_\beta+1), v'_\alpha+v'_\beta+1, -v'_\alpha) \rightarrow (-v'_\beta, v'_\alpha+v'_\beta, -v'_\alpha) \rightarrow (-v'_\beta, v'_\alpha+v'_\beta+1, -(v'_\alpha+1)) \rightarrow (-(v'_\beta+1), v'_\alpha+v'_\beta+1, -v'_\alpha)$, corresponding to a duty cycle $t_3/2 \rightarrow t_0 \rightarrow t_1 \rightarrow t_3/2$, any one of the three modes is selected.

It can be known from the above deduction that in the $\alpha'$-$\beta'$ coordinate system, as long as a number of cascaded sub-modules of the star-connected converter is a half number of cascaded sub-modules of the delta-connected converter, and the line voltage reference signals outputted by the star-connected converter are equal to the line voltage reference signals outputted by the delta-connected converter, then coordinate components of a phase voltage reference vector of the star-connected converter and a sum of the two components may be used as the reference vector signals of the line voltage of the delta-connected converter, and coordinate components of the basic vector calculated by the star-connected converter according to a phase voltage and a sum of the two components are used as the switching states corresponding to the line voltage of the delta-connected converter, thus realizing the space vector modulation of the delta-connected converter.

Further, in the $\alpha'$-$\beta'$ coordinate system, the simplified space vector modulation method for the multi-level converter proposed by the present disclosure may be used to modulate the star-connected converter formed by cascading 2k H-bridge sub-modules, and a specific implementation method is as follows. Firstly, a star-connected converter is imagined (each phase of the converter is formed by cascading k H-bridge sub-modules). Secondly, the phase voltage reference signals of the controlled converter are divided by $\sqrt{3}$ to obtain phase voltage reference signals of the imaged converter. Thirdly, in the $\alpha'$-$\beta'$ coordinate system, a phase voltage reference vector trajectory model of the imaged converter is sampled, the reference vector is synthesized by using three equivalent basic vectors on the sector triangle, the coordinate components of the equivalent basic vector and the sum of the two coordinate components are used as switching state signals of three phases of the controlled converter, and the controlled converter is directly controlled by using the space vector of the imagined converter to realize space vector modulation.

It is apparent for those skilled in the art that the present disclosure is not limited to the details of the above exemplary embodiments, and the present disclosure can be realized in other specific forms without departing from the spirit or basic characteristics of the present disclosure. Therefore, the embodiments should be regarded as being exemplary and non-limiting from any point of view, and the scope of the present disclosure is defined by the appended claims rather than the above description, so the present disclosure is intended to comprise all changes falling within the meaning and range of equivalent elements of the claims. Any reference numerals in the claims should not be regarded as limiting the claims involved.

What is claimed is:

1. A simplified space vector modulation method for a multi-level converter, comprising the following steps of:

step 1: an expression of a basic vector $V_{\alpha\beta}(v_\alpha, v_\beta)$ corresponding to a phase voltage in a traditional Cartesian coordinate system (referred to as an $\alpha$-$\beta$ coordinate system) being:

$$\begin{bmatrix} v_\alpha \\ v_\beta \end{bmatrix} = \begin{bmatrix} \frac{1}{3}(2v_a - v_b - v_c) \\ \frac{\sqrt{3}}{3}(v_b - v_c) \end{bmatrix},$$

wherein $v_\alpha$ and $v_\beta$ represent coordinate components corresponding to the basic vector $V_{\alpha\beta}$, $v_a$, $v_b$ and $v_c$ respectively represent levels corresponding to three phase voltages of the multi-level converter, $(v_a, v_b, v_c)$ is called a switching state corresponding to the basic vector $V_{\alpha\beta}$, and for an n-level converter, wherein n is an integer and equals to two or greater, $v_a, v_b, v_c \in [(n-1), (n-2), \ldots, 2, 1, 0]$; and a reference vector $V_{r\alpha\beta}(v_{r\alpha}, v_{r\beta})$ calculated according to phase voltage reference signals in the $\alpha$-$\beta$ coordinate system being:

$$\begin{bmatrix} v_{r\alpha} \\ v_{r\beta} \end{bmatrix} = \frac{\sqrt{3}}{3} m(n-1) \begin{bmatrix} \cos \omega t \\ \sin \omega t \end{bmatrix};$$

wherein $v_{r\alpha}$ and $v_{r\beta}$ represent coordinate components corresponding to the reference vector $V_{r\alpha\beta}$;

step 2: rotating a coordinate axis of an $\alpha$-$\beta$ plane counterclockwise by 45 degrees and compressing an axial proportion to obtain an $\alpha'$-$\beta'$ coordinate system, and establishing a reference vector trajectory model;

a basic vector $V'(v'_\alpha, v'_\beta)$ in the coordinate system $\alpha'$-$\beta'$ being:

$$\begin{bmatrix} v'_\alpha \\ v'_\beta \end{bmatrix} = \begin{bmatrix} 1 & 0 & -1 \\ -1 & 1 & 0 \end{bmatrix} \begin{bmatrix} v_a \\ v_b \\ v_c \end{bmatrix} = \begin{bmatrix} v_a - v_c \\ -v_a + v_b \end{bmatrix},$$

wherein $v'_\alpha$ and $v'_\beta$ represent coordinate components corresponding to the basic vector V';

a reference vector $V'_r(v'_{r\alpha}, v'_{r\beta})$ calculated according to phase voltage reference signals in the α'-β' coordinate system being:

$$\begin{bmatrix} v'_{r\alpha} \\ v'_{r\beta} \end{bmatrix} = \frac{m(n-1)}{2} \begin{bmatrix} \sqrt{3}\cos\omega t + \sin\omega t \\ -\sqrt{3}\cos\omega t + \sin\omega t \end{bmatrix},$$

wherein $v'_{r\alpha}$ and $v'_{r\beta}$ represent coordinate components corresponding to the reference vector $V'_r$;

the reference vector trajectory model in the α'-β' coordinate system being:

$$\left(\frac{v'_{r\alpha} + v'_{r\beta}}{m(n-1)}\right)^2 + \left(\frac{v'_{r\alpha} - v'_{r\beta}}{\sqrt{3}\, m(n-1)}\right)^2 = 1;$$

$$m = \frac{\sqrt{3}\, U_r}{(n-1)E};$$

wherein $U_r$ represents a phase voltage amplitude expected to be outputted by the multi-level converter, which is also called a reference voltage amplitude, and E represents a direct current voltage corresponding to a unit level;

step 3: in the α'-β' coordinate system, respectively representing line voltage reference signals $-u_{rca}$, $-u_{rab}$ and $u_{rbc}$ by the coordinate components $v'_{r\alpha}$ and $v'_{r\beta}$ of the reference vector $V'_r$ and the sum of the two components $v'_{r\alpha}+v'_{r\beta}$, and respectively representing line voltage level signals $-v_{ca}$, $-v_{ab}$ and $v_{bc}$ by the coordinate components $v'_\alpha$ and $v'_\beta$ of the basic vector V' and the sum of the two coordinate components $v'_\alpha+v'_\beta$:

$$\begin{cases} v'_{r\alpha} = u_{ra} - u_{rc} = -u_{rca} \\ v'_{r\beta} = -u_{ra} + u_{rb} = -u_{rab} \\ v'_{r\alpha} + v'_{r\beta} = u_{rb} - u_{rc} = u_{rbc} \end{cases},$$

wherein $u_{rab}$, $u_{rbc}$ and $u_{rca}$ respectively the represent reference signals of the three line voltages;

$$\begin{bmatrix} v'_\alpha \\ v'_\beta \\ v'_\alpha + v'_\beta \end{bmatrix} == \begin{bmatrix} v_a - v_c \\ -v_a + v_b \\ v_b - v_c \end{bmatrix} = \begin{bmatrix} -v_{ca} \\ -v_{ab} \\ v_{bc} \end{bmatrix},$$

wherein $v_{ab}$, $v_{bc}$ and $v_{ca}$ respectively represent levels corresponding to the three line voltages, $v_{ab}$, $v_{bc}$, $v_{ca} \in [\pm n, \pm(n-1), \ldots, \pm 2, \pm 1, 0]$, and each line voltage outputs 2n+1 levels;

step 4: constructing a new star-connected multi-level converter, so that line voltage reference signals of the new star-connected multi-level converter are the same as line voltage reference signals of a controlled delta-connected multi-level converter;

step 5: sampling a phase voltage reference vector trajectory model of the constructed star-connected multi-level converter, calculating three basic vectors closest to the sampled reference vector $V'_r$, using the three basic vectors as equivalent basic vectors, the three equivalent basic vectors forming a sector triangle, and synthesizing the reference vector by using the three equivalent basic vectors;

step 6: calculating duty cycles of the equivalent basic vectors which synthesize the sampled reference vector by using the volt-second balance principle:

when the reference vector is located in Sector-I:

$$\begin{cases} t_1 = T_S(1 + v'_\alpha - v'_{r\alpha}) \\ t_2 = T_S(1 + v'_\beta - v'_{r\beta}) \\ t_3 = T_S(v'_{r\alpha} + v'_{r\beta} - v'_\alpha - v'_\beta - 1) \end{cases},$$

wherein $t_1$, $t_2$ and $t_3$ respectively represent duty cycles of vectors $V'_1$, $V'_2$ and $V'_3$, and $T_S$ represents the sampling period;

when the reference vector is located in Sector-II:

$$\begin{cases} t_0 = T_S(1 + v'_\alpha + v'_\beta - v'_{r\alpha} - v'_{r\beta}) \\ t_1 = T_S(v'_{r\alpha} - v'_\alpha) \\ t_3 = T_S(v'_{r\beta} - v'_\beta) \end{cases},$$

wherein $t_0$, $t_1$ and $t_3$ respectively represent duty cycles of vectors $V'_0$, $V'_1$ and $V'_3$; and step 7: using the components of the equivalent basic vector of the phase voltage reference vector of the star-connected multi-level converter and the sum of the two components as switching states for controlling a line voltage of the delta-connected multi-level converter.

2. The simplified space vector modulation method for the multi-level converter according to claim 1, wherein in step 5, the sector triangles formed by three adjacent basic vectors are all isosceles right triangles, a length of a right side of the isosceles right triangle is unit 1, the sector triangles are in Sector-I and Sector-II, and the basic vectors forming Sector-I and Sector-II comprise $V'_0(v'_\alpha, v'_\beta)$, $V'_1(v'_\alpha+1, v'_\beta)$, $V'_2(v'_\alpha+1, v'_\beta+1)$ and $V'_3(v'_\alpha, v'_\beta+1)$, and $$\begin{cases} v'_\alpha = \text{floor}(v'_{r\alpha}) \\ v'_\beta = \text{floor}(v'_{r\beta}) \end{cases},$$

wherein floor(*) represents a rounding down function;

in a first case: wherein $(v'_{r\alpha}-v'_\alpha)+(v'_{r\beta}-v'_\beta) \geq 1$, the reference vector is located in Sector-I, and the reference vector is synthesized by using the vectors $V'_1(v'_\alpha+1, v'_\beta)$, $V'_2(v'_\alpha+1, v'_\beta+1)$ and $V'_3(v'_\alpha, v'_\beta+1)$; and in a second case: wherein $(v'_{r\alpha}-v'_\alpha)+(v'_{r\beta}-v'_\beta) < 1$, the reference vector is located in Sector-II, and the reference vector is synthesized by using the vectors $V'_0(v'_\alpha, v'_\beta)$, $V'_1(v'_\alpha+1, v'_\beta)$ and $V'_3(v'_\alpha, v'_\beta+1)$.

3. The simplified space vector modulation method for the multi-level converter according to claim 2, wherein:

in the first case:

when the reference voltage vector $V'_r$ is synthesized by using $V'_1$, $V'_2$ and $V'_3$ according to volt-second balance principle, the switching states of the corresponding delta-connected multi-level converter are respectively $(-v'_\beta, v'_\alpha+v'_\beta+1, -(v'_\alpha+1))$, $(-(v'_\beta+1), v'_\alpha+v'_\beta+2, -(v'_\alpha+1))$ and $(-(v'_\beta+1), v'_\alpha+v'_\beta+1, -v'_\alpha)$:

(1) during the duty cycle of the basic vector $V'_1$, $-v'_\beta$, $v'_\alpha+v'_\beta+1$ and $-(v'_\alpha+1)$ are respectively used as control signals of a phase AB, a phase BC and a phase CA of the controlled delta-connected multi-level converter;

(2) during the duty cycle of the basic vector $V'_2$, $-(v'_\beta+1)$, $v'_\alpha+v'_\beta+2$ and $-(v'_\alpha+1)$ are respectively used as control signals of a phase AB, a phase BC and a phase CA of the controlled delta-connected multi-level converter;

(3) during the duty cycle of the basic vector $V'_3$, $-(v'_\beta+1)$, $v'_\alpha+v'_\beta+1$ and $-v'_\alpha$ are respectively used as control signals of a phase AB, a phase BC and a phase CA of the controlled delta-connected multi-level converter;

in the second case:

when the reference voltage vector $V'_r$ is synthesized by using $V'_0$, $V'_1$ and $V'_3$ according to the time-sharing system, the switching states of the corresponding delta-connected multi-level converter are respectively $(-v'_\beta, v'_\alpha+v'_\beta, -v'_\alpha)$, $(-v'_\beta, v'_\alpha+v'_\beta+1, -(v'_\alpha+1))$ and $(-(v'_\beta+1), v'_\alpha+v'_\beta+1, -v'_\alpha)$:

(1) during the duty cycle of the basic vector $V'_0$, $-v'_\beta$, $v'_\alpha+v'_\beta$ and $-v'_\alpha$ are respectively used as control signals of a phase AB, a phase BC and a phase CA of the controlled delta-connected multi-level converter;

(2) during the duty cycle of the basic vector $V'_1$, $-v'_\beta$, $v'_\alpha+v'_\beta+1$ and $-(v'_\alpha+1)$ are respectively used as control signals of a phase AB, a phase BC and a phase CA of the controlled delta-connected multi-level converter;

(3) during the duty cycle of the basic vector $V'_3$, $-(v'_\beta+1)$, $v'_\alpha+v'_\beta+1$ and $-v'_\alpha$ are respectively used as control signals of a phase AB, a phase BC and a phase CA of the controlled delta-connected multi-level converter.

4. The simplified space vector modulation method for the multi-level converter according to claim 3, wherein a sum of the three components of the switching states at any moment is 0, which means that an output common-mode voltage of a three-phase converter is 0.

5. The simplified space vector modulation method for the multi-level converter according to claim 3, wherein the switching states are used as the control signals of the line voltage of the delta-connected multi-level converter, wherein two components of every two of three switching states differ by one level, and during one sampling period of the reference vector, when the switching states are switched, a switching path is closed by a four-segment switching method with any one of the three switching states as a starting point, a switching state switching sequence in the first case is provided with three modes:

mode (1): $(-v'_\beta, v'_\alpha+v'_\beta+1, -(v'_\alpha+1)) \to (-(v'_\beta+1), v'_\alpha+v'_\beta+2, -(v'_\alpha+1)) \to (-(v'_\beta+1), v'_\alpha+v'_\beta+1, -v'_\alpha) \to (-v'_\beta, v'_\alpha+v'_\beta+1, -(v'_\alpha+1))$, corresponding to a duty cycle $t_1/2 \to t_2 \to t_3 \to t_1/2$, mode (2): $(-(v'_\beta+1), v'_\alpha+v'_\beta+2, -(v'_\alpha+1)) \to (-(v'_\beta+1), v'_\alpha+v'_\beta+1, -v'_\alpha) \to (-v'_\beta, v'_\alpha+v'_\beta+1, -(v'_\alpha+1)) \to (-(v'_\beta+1), v'_\alpha+v'_\beta+2, -(v'_\alpha+1))$, corresponding to a duty cycle $t_2/2 \to t_3 \to t_1 \to t_2/2$, mode (3): $(-(v'_\beta+1), v'_\alpha+v'_\beta+1, -v'_\alpha) \to (-v'_\beta, v'_\alpha+v'_\beta+1, -(v'_\alpha+1)) \to (-(v'_\beta+1), v'_\alpha+v'_\beta+2, -(v'_\alpha+1)) \to (-(v'_\beta+1), v'_\alpha+v'_\beta+1, -v'_\alpha)$, corresponding to a duty cycle $t_3/2 \to t_1 \to t_2 \to t_3/2$, any one of the three modes in the first case is selected; and the switching state switching sequence in the second case is provided with three modes:

(mode (1): $(-v'_\beta, v'_\alpha+v'_\beta, -v'_\alpha) \to (-v'_\beta, v'_\alpha+v'_\beta+1, -(v'_\alpha+1)) \to (-(v'_\beta+1), v'_\alpha+v'_\beta+1, -v'_\alpha) \to (-v'_\beta, v'_\alpha+v'_\beta, -v'_\alpha)$, corresponding to a duty cycle $t_0/2 \to t_1 \to t_3 \to t_0/2$, mode (2): $(-v'_\beta, v'_\alpha+v'_\beta+1, -(v'_\alpha+1)) \to (-(v'_\beta+1), v'_\alpha+v'_\beta+1, -v'_\alpha) \to (-v'_\beta, v'_\alpha+v'_\beta, -v'_\alpha) \to (-v'_\beta, v'_\alpha+v'_\beta+1, -(v'_\alpha+1))$, corresponding to a duty cycle $t_1/2 \to t_3 \to t_0 \to t_1/2$, mode (3): $(-(v'_\beta+1), v'_\alpha+v'_\beta+1, -v'_\alpha) \to (-v'_\beta, v'_\alpha+v'_\beta, -v'_\alpha) \to (-v'_\beta, v'_\alpha+v'_\beta+1, -(v'_\alpha+1)) \to (-(v'_\beta+1), v'_\alpha+v'_\beta+1, -v'_\alpha)$, corresponding to a duty cycle $t_3/2 \to t_0 \to t_1 \to t_3/2$, any one of the three modes in the second case is selected.

6. The simplified space vector modulation method for the multi-level converter according to claim 1, wherein each phase in the delta-connected multi-level converter is formed by cascading 2k H-bridge sub-modules, wherein k is an integer and equals to two or greater, an output line voltage has 4k+1 levels, each phase in the star-connected multi-level converter is formed by cascading k H-bridge sub-modules, an output phase voltage has 2k+1 levels, and the output line voltage has 4k+1 levels, which means that a number of levels of the output line voltage of the star-connected converter formed by cascading k H-bridge sub-modules is equal to a number of levels of the output line voltage of the delta-connected converter formed by cascading 2k H-bridge sub-modules.

7. The simplified space vector modulation method for the multi-level converter according to claim 1, wherein in the $\alpha'$-$\beta'$ coordinate system, the star-connected converter is formed by cascading 2k H-bridge sub-modules and is modulated by the simplified multi-level converter space vector modulation method, wherein k is an integer and equals to two or greater.

* * * * *